United States Patent
Jiang et al.

(10) Patent No.: US 7,257,276 B2
(45) Date of Patent: Aug. 14, 2007

(54) DIGITAL IMAGE INTERPOLATION METHOD

(75) Inventors: Yan-Ru Jiang, Beijing (CN); Po-Chiang Yeh, Beijing (CN)

(73) Assignee: Primax Electronics Ltd., Taipei (TW)

( * ) Notice: Subject to any disclaimer, the term of this patent is extended or adjusted under 35 U.S.C. 154(b) by 832 days.

(21) Appl. No.: 10/464,504

(22) Filed: Jun. 19, 2003

(65) Prior Publication Data

US 2004/0258329 A1   Dec. 23, 2004

(51) Int. Cl.
*G06K 9/32* (2006.01)
(52) U.S. Cl. ............ 382/300; 382/165; 382/204; 382/206; 358/525; 358/448
(58) Field of Classification Search ............ 382/274, 382/275, 300, 525, 164, 165, 204, 205, 206; 358/515, 525, 448
See application file for complete search history.

(56) References Cited

U.S. PATENT DOCUMENTS

| | | | | |
|---|---|---|---|---|
| 5,103,306 A | * | 4/1992 | Weiman et al. | 348/400.1 |
| 5,600,380 A | * | 2/1997 | Patel et al. | 348/614 |
| 5,731,849 A | * | 3/1998 | Kondo et al. | 348/699 |
| 5,861,917 A | * | 1/1999 | Tariki et al. | 348/230.1 |
| 5,978,011 A | * | 11/1999 | Jacob et al. | 347/251 |
| 6,555,278 B1 | * | 4/2003 | Loveridge et al. | 430/7 |
| 6,618,503 B2 | * | 9/2003 | Hel-or et al. | 382/167 |
| 6,831,641 B2 | * | 12/2004 | Matusik et al. | 345/420 |
| 6,847,737 B1 | * | 1/2005 | Kouri et al. | 382/260 |

\* cited by examiner

*Primary Examiner*—Yosef Kassa
(74) *Attorney, Agent, or Firm*—Harness, Dickey & Pierce, P.L.C.

(57) ABSTRACT

A digital image interpolation method is disclosed which a projection point (x, y) of the original image corresponding to a pixel of the transformed image first is determined. According to neighboring pixels (m, n) of the projection point, Gauss weights $W_i$ then are determined. Lastly, according to the Gauss weights Wi and the corresponding color value Vi of the neighboring pixels, a color value f (x, y) of the projection point is computed. Via an interpolation method using Gauss weight, the computation time is reduced while qualitatively improving the image processing.

11 Claims, 4 Drawing Sheets

DIGITAL IMAGE INTERPOLATION METHOD

BACKGROUND OF THE INVENTION

1. Field of Invention

The present invention relates to a digital image interpolation method, and more particularly to a digital image interpolation method implementing Gauss weight.

2. Related Art

When an image display has to be magnified/reduced or rotated, the original image pixels are typically rearranged according to a new configuration of pixels. If an image is magnified, the holes between the original pixels also are magnified, and new pixels must be used to fill these holes. When the image is reduced, the pixels are mixed with one another to form new pixels. To fill a created hole, a method known in the art performs a calculation based upon the color values of neighboring points to obtain a color value to be filled in the hole. This method is generally called an interpolation method, generally implemented in the rearrangement of image pixels. The purpose of the interpolation method is to determine the filling data of holes between known image pixels.

Several digital image interpolation methods are known in the art, the fastest method consists of copying the color values of the nearest neighboring pixel points. Although this latter method is faster, it usually creates saw tooth effects. Another method is the bilinear interpolation, in which the weight values of the four adjacently neighboring pixel points of each considered pixel are taken, and adequate shadows between the pixels are established to obtain a smooth transition. Although the bilinear interpolation provides better results, it is more time-consuming. The bi-cubic interpolation is another known method. The method of bilinear interpolation employs a four-pixel neighborhood surrounding the calculated pixel address to obtain a new transformed pixel value. Similarly, the method of bi-cubic interpolation involves fitting a series of cubic polynomials to the brightness values contained in the 4×4 array of pixels surrounding the calculated address. The bi-cubic interpolation method provides the best results, but is even more time-consuming than the bilinear interpolation. Therefore, the interpolation methods of the prior arts as described above still have disadvantages, either providing unsatisfactory results or being excessively time-consuming. As a result, there is a need for an interpolation method that, implemented in the process of image transformation, is less time-consuming.

SUMMARY OF THE INVENTION

It is therefore an object of the invention to provide an interpolation method that can overcome the disadvantages above, and is adapted to improve the image processing qualitatively with a faster processing speed.

To accomplish the objectives above and other objectives, the invention provides a digital image interpolation method in which a projection point (x, y) of the original image, corresponding to a pixel of the transformed image, first is determined. According to neighboring pixels (m, n) of the projection point, Gauss weights, $W_i$, then are determined. Lastly, according to the Gauss weights Wi and the corresponding color value Vi of the neighboring pixels, a color value f (x, y) of the projection point is computed.

According to an embodiment of the invention, only four neighboring pixel points are considered in the interpolation method to reduce the processing time, while improving the image display.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description in the illustration below only, and thus are not limitative of the present invention.

DETAILED DESCRIPTION OF THE INVENTION

According to the invention, an interpolation method is implemented to determine hole-filling data between given pixels of an image display. It is well known that image display has numerous image points or pixels. When the user performs a transformation of the image display, such as an image magnification, an image reduction or an image rotation, the pixels are rearranged to form a new pixel configuration. In this process, an interpolation method is implemented to reduce the alteration of the original image, due to geometric distortions.

Figure 1:
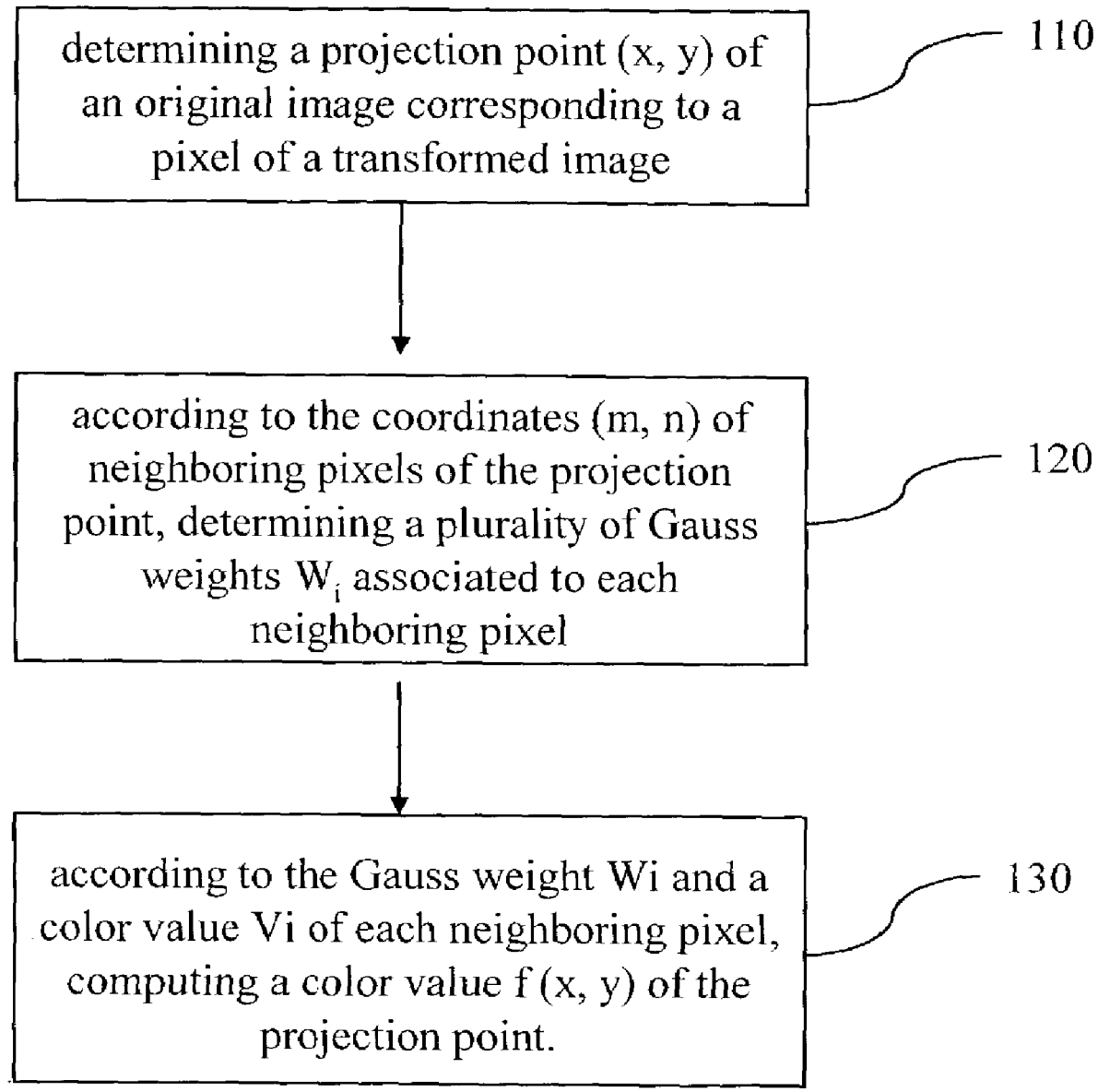
FIG. 1 is a flow chart, generally illustrating a digital image interpolation method, according to an embodiment of the invention.

Referring to FIG. 1, a flow chart illustrates a digital image interpolation method schematically, according to an embodiment of the invention. First, a projection point (x, y) of the original image, corresponding to a pixel point of the transformed image, is determined (step 110). According to the neighboring pixels (m, n) of the projection point, the respective Gauss weights Wi of the neighboring pixels are determined (step 120). Then, according to the Gauss weights Wi and the values Vi of the neighboring pixels, a color value f (x, y) of the projection point is determined (step 130).

When a digital image has to be edited, it may undergo various types of geometric transformations, such as an image rotation, an image stretching, an image torsion, etc. Through each geometric transformation, the image pixels are usually rearranged into another configuration where the corresponding transformed image is a projection of the original image. This relationship between the original image and the transformed image is generally represented by a function that computes the projection transformation.

Figure 2A:
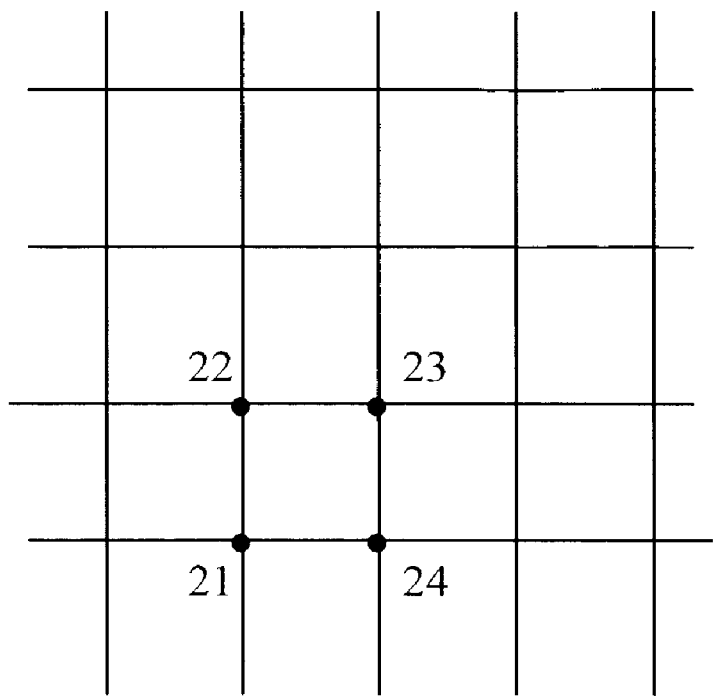
FIG. 2A and FIG. 2B are schematic views, illustrating the implementation of an interpolation method, according to the invention in an image transformation.
Figure 2B:
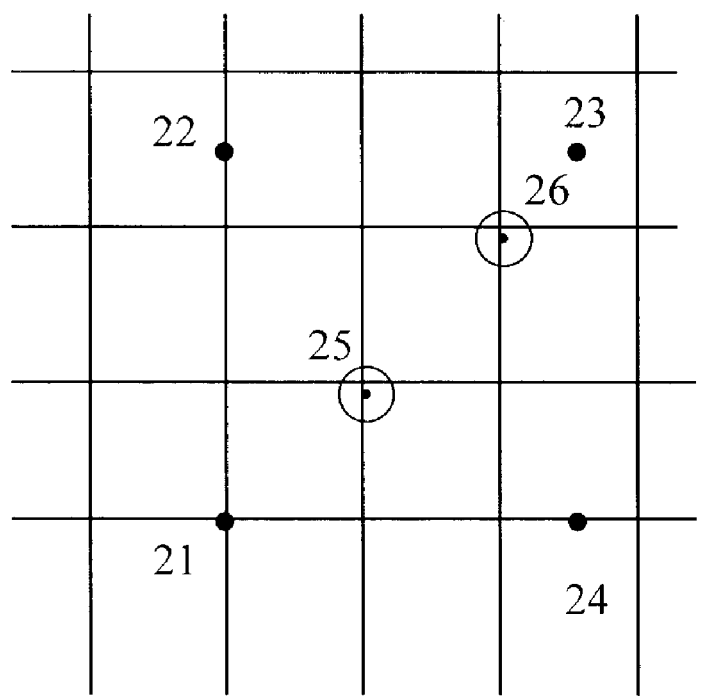

FIG. 2A illustrates a configuration, corresponding to an original image including four pixels 21, 22, 23, 24, which may be any four pixels of an original image display. FIG. 2B illustrates the configuration of a transformed image, corresponding to an image magnification of FIG. 2A. A relation of projection can be established typically between the original image and the transformed image. In the transformed image, newly configured pixels 25, 26 have to be attributed color values. After the relation of projection between the original image and the transformed image has been established, a reverse transformation is used to obtain a point of the original image, corresponding to a new pixel of the transformed image. From the corresponding point of the original image, the color value, to be added to the new pixel of the transformed image, is calculated. The reverse transformation applies to pixels of the transformed image, to determine the corresponding points of the original image. This reverse transformation is also a projection type transformation. Therefore, two types of projection may be defined: a first projection from the original image to the transformed image, and a second or "reverse" projection from the transformed image to the original image. In the first projection, several points of the original image are being projected on a same point of the transformed image, which leads to redundant computing. In addition, if the projection from the original image to the transformed image is not a full projection, some points of the transformed image may not be corresponding to points of the original image, which induces the formation of holes. Since it does not create these problems, the reverse projection therefore is adopted in this embodiment of the invention.

Figure 3:
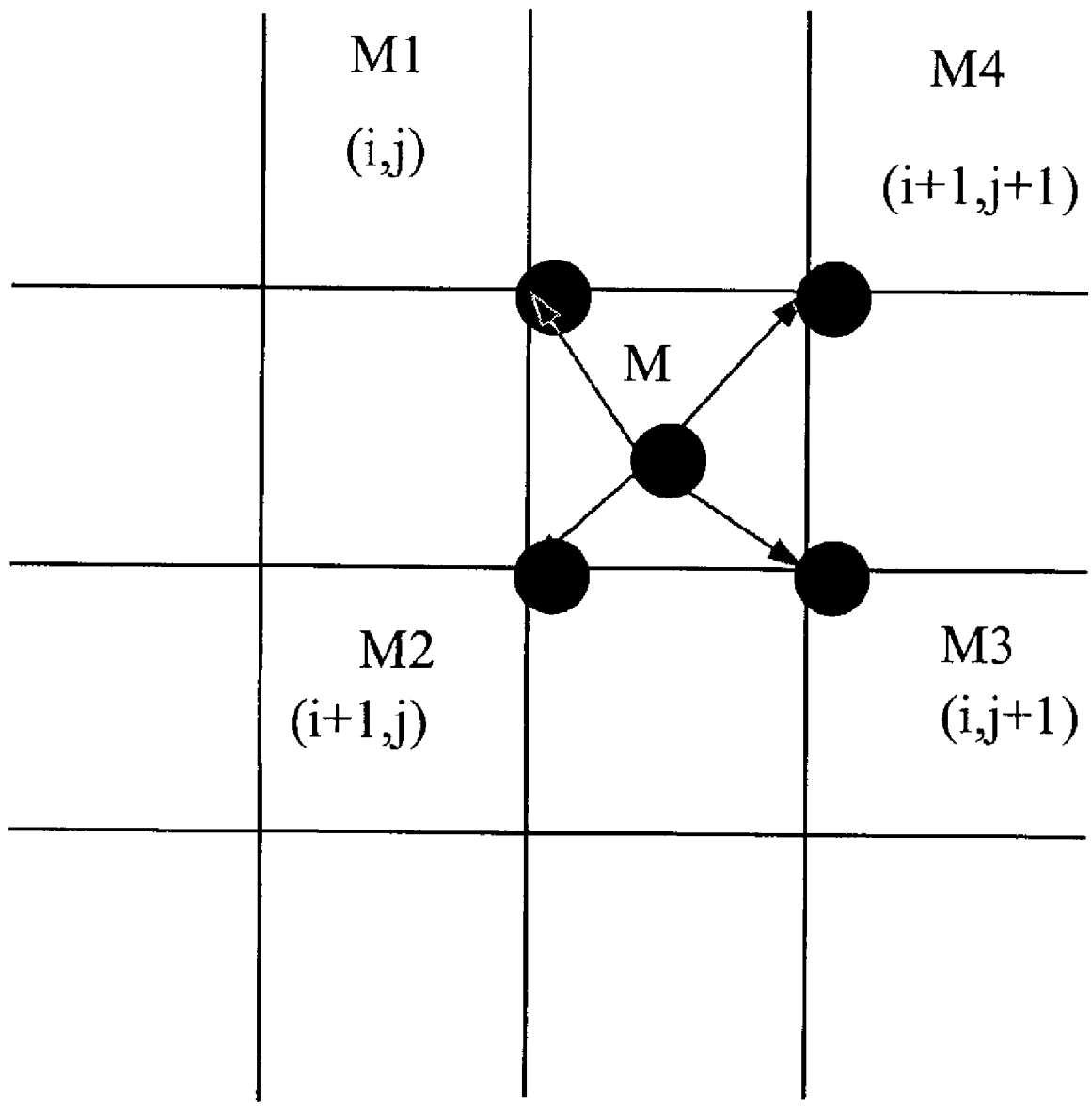
FIG. 3 is a schematic view, illustrating the mechanism of the digital image interpolation method, according to an embodiment of the invention.

Practically, the corresponding function of the reverse projection is the inverse function of the first projection. For example, if FIG. 2B is an 2.5-times magnification with respect to the horizontal coordinates of the pixel points of FIG. 2A, the reverse projection applied to the point 25 reduces 2.5 times its horizontal coordinate, to obtain the corresponding projection point of the original image as illustrated in FIG. 2A. If the result of the reverse projection corresponds to a pixel of the original image, the interpolation data are the color value of this corresponding pixel of the original image. However, there may be a situation where the reverse projection of the point 25 does not exactly correspond to the coordinates of a pixel of the original image but, instead, gives a hole between pixels. In this case, the color value of the resulting projection point, obtained from the reverse projection, has to be calculated by means of neighboring points. Typically, the integer part of the coordinates of the projection point is taken, which gives one of the neighboring pixels. As illustrated in FIG. 3, M (x, y) is the projection of the point 23, and the values of the projection point are the interpolation data. The respective integer parts of the coordinates of the point M (x, y) are (i, j), which corresponds to the coordinates of a neighboring pixel. The four identified neighboring pixels therefore are: $M_1$ (i, j), $M_2$ (i+1, j), $M_3$ (i, j+1), and $M_4$ (i+1, j+1). It will be understood that more pixels may be considered such as, for example, the 16 nearest neighboring pixels around the projection point. The more pixels are considered, the more precise is the value calculated for the projection point, but the longer is the processing time.

After the projection point of the original image (obtained from the reverse projection) has been determined, the neighboring pixels are considered to determine the color value of the projection point. According to this embodiment of the invention, weight of the respective values of the neighboring pixels is performed to calculate the color value of the projection point. More particularly, the following formula is computed to determine the color value of M (x, y):

$$f(x, y) = \Sigma_{(i=1, k)} W_i \times V_i,$$

wherein $M_i$ are the neighboring pixels of the projection point M (x, y), and $V_i$ is the RGB color value of $M_i$, obtained by means of an image sensor. $W_i$ is the Gauss weight, having the following characteristics:

$$W_i = e^{-r\sqrt{(x-m)^2 + (y-n)^2}}, \text{ and}$$

$$\Sigma_{(i=1, 4)} W_i = 1,$$

wherein (m, n) are the coordinates of each neighboring pixel and r is a coefficient.

Experimental tests show that if four neighboring pixels are considered, the computation time required is relatively short for a relatively good image display. This embodiment of the invention therefore is exemplary implemented with, but not limited to, a four-points interpolation. When four pixels are used in the interpolation (i.e. order K is 4), the four Gauss weights have to be calculated according to the coordinates of the four neighboring pixels. The four Gauss weights respectively are:

$$W_1 = e^{-r\sqrt{(x-i)^2 + (y-j)^2}},$$

$$W_2 = e^{-r\sqrt{(x-i-1)^2 + (y-j)^2}},$$

$$W_3 \times e^{-r\sqrt{(x-i-1)^2 + (y-j-1)^2}}, \text{ and}$$

$$W_4 \times e^{-r\sqrt{(x-i)^2 + (y-j-1)^2}}.$$

By using the relation $W_1+W_2+W_3+W_4=1$, the value r is obtained. Then, a re-injection of the value r in the above relations gives the four Gauss weights. The value of f(x, y) accordingly can be determined, which corresponds to the filling data.

Figure 4:
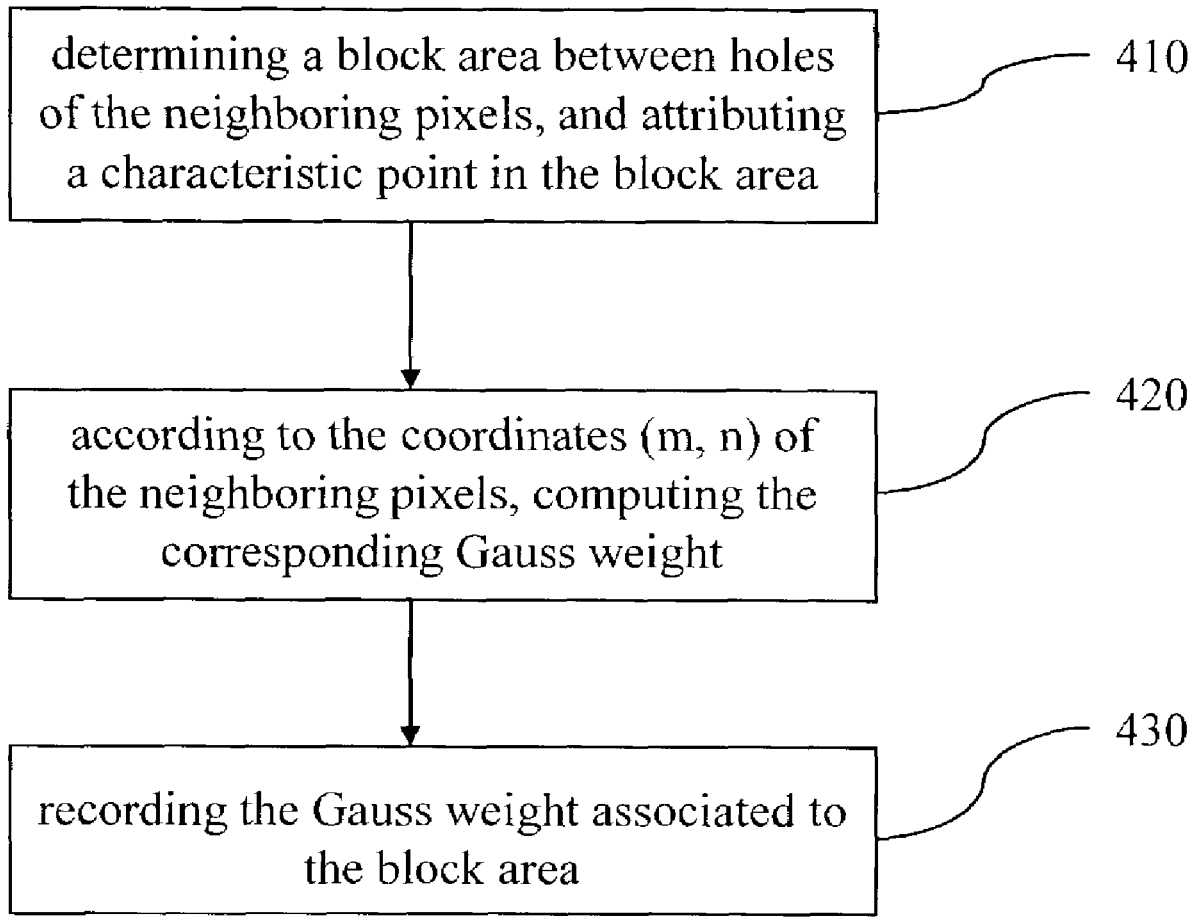
FIG. 4 is a flow chart, illustrating the process of establishing a weight table used in a digital image interpolation method, according to an embodiment of the invention.

In the method above, all the projection points of the original image are taken one-by-one to perform the weight calculation of the interpolation. Alternatively, a weight table may be used to reduce the computation time. The provided weight table records all the weights corresponding to each area of the image. The weight value of each image area can be thereby checked and found in the weight table, to determine the interpolation data. FIG. 4 is a flow chart schematically illustrating the process of establishing the weight table, according to an embodiment of the invention. First, the hollows between the image pixels are divided into a grid of small blocks or areas. For example, a rectangular zone defined by four image pixels may be divided into a grid of 100*100 small areas, in other words: the rectangular zone between the four image pixels comprises 10,000 block areas. The center of each area is taken as the characteristic point (step 410) to calculate the Gauss weight $W_i$. The weight of the characteristic point is calculated according to the coordinates (m, n) of the neighboring pixels (step 420). The coordinates and the corresponding Gauss weight then are recorded to form the weight table (step 430).

When an interpolation is performed, the provision of the interpolation coordinates gives the corresponding Gauss weights in the weight table. According to the Gauss weights $W_i$ and the values $V_i$ of the neighboring pixels, the value f (x, y) of the characteristic point can be thereby calculated. The calculation of the weight $W_i$ may be performed between, for example, the points (0, 0), (0, 1), (1, 0), and (1, 1). Other situations may be projected to these four points, and then, according to the Gauss weights, the interpolation data are calculated. Redundant computation steps are thereby avoided. By using the weight table to process each block area and associate a weight value, the interpolation computation is much faster than that applied one-by-one to each point.

It will be apparent to the person skilled in the art that the invention as described above may be varied in many ways, and notwithstanding remaining within the spirit and scope of the invention as defined in the following claims.

What is claimed is:

1. A digital image interpolation method, comprising:
   determining a projection point (x, y) of an original image corresponding to a pixel of a transformed image;
   according to the coordinates (m, n) of neighboring pixels of the projection point, determining a plurality of Gauss weights $W_i$ associated to each neighboring pixel; and
   according to the Gauss weight Wi and a color value Vi of each neighboring pixel, computing a color value f (x, y) of the projection point;
   wherein determining a plurality of Gauss weights $W_i$ associated to each neighboring pixel according to the coordinates (m, n) of the neighboring pixels of the projection point is performed by computing the following formula:

$$W_i = e^{-r\sqrt{(x-m)^2 + (y-n)^2}},$$

wherein r is a coefficient calculated from the relation: $\Sigma_{(i=1, 4)} W_i = 1$.

2. The interpolation method of claim 1, wherein the step of determining a projection point (x, y) further comprises:
   determining a relation of projection from the original image to the transformed image; and
   calculating the coordinates of the projection point obtained from a reverse projection applied to the pixel of the transformed image.

3. The interpolation method of claim 1, wherein the number of neighboring pixels of the projection point is 4.

4. The interpolation method of claim 3, wherein the number of neighboring pixels of the projection point being 4 and the order K of the interpolation being 4, the coordinates of the four neighboring pixels respectively are (i, j), (i+1, j), (i, j+1), and (i+1, j+1), the Gauss weight $W_i$ are calculated as follows:

$$W_1 = e^{-r\sqrt{(x-i)^2 + (y-j)^2}},$$

$$W_2 = e^{-r\sqrt{(x-i-1)^2 + (y-j)^2}},$$

$$W_3 = e^{-r\sqrt{(x-i-1)^2 + (y-j-1)^2}}, \text{ and}$$

$$W_4 = e^{-r\sqrt{(x-i)^2 + (y-j-1)^2}}.$$

5. The interpolation method of claim 4, wherein the coordinate (i, j) are obtained from the integer part of the coordinates (x, y) of the projection point.

6. The interpolation method of claim 1, wherein the number of neighboring pixels of the projection point is 16.

7. The interpolation method of claim 1, wherein the step of computing a value f (x, y) of the projection point according to the Gauss weight Wi and a color value Vi of each neighboring pixel is performed via computing the following formula:

$$f(x, y) = \Sigma_{(i=1, k)} W_i \times V_i,$$

wherein k is the number of neighboring pixels.

8. The interpolation method of claim 1, wherein the color value $V_i$ of each neighboring pixel is the corresponding RGB (red, green, blue) value.

9. A digital image interpolation method, comprising:
   determining a projection point (x, y) of an original image corresponding to a pixel of a transformed image;
   according to the coordinates (m, n) of neighboring pixels of the projection point, determining a plurality of Gauss weights $W_i$ associated to each neighboring pixel; and
   according to the Gauss weight Wi and a color value Vi of each neighboring pixel, computing a color value f (x, y) of the projection point;
   wherein determining a plurality of Gauss weights $W_i$ associated to each neighboring pixel according to the coordinates (m, n) of the neighboring pixels of the projection point is performed by checking in a weight table, and the weight table is established via a method comprising:
   determining a block area between holes of the neighboring pixels, and attributing a characteristic point in the block area;
   according to the coordinates (m, n) of the neighboring pixels, computing the corresponding Gauss weight; and
   recording the Gauss weight associated to the block are.

10. The interpolation method of claim 9, wherein the step of determining a block are between the holes of the neighboring pixels is performed via dividing a zone defined by the four neighboring pixels into a plurality of small block areas.

11. The interpolation method of claim 10, wherein the characteristic point is the center of the block area.

* * * * *